(12) United States Patent
Nomura

(10) Patent No.: US 7,152,480 B2
(45) Date of Patent: Dec. 26, 2006

(54) DIFFERENTIAL PRESSURE DETECTION TYPE PRESSURE SENSOR AND METHOD FOR MANUFACTURING THE SAME

(75) Inventor: Hiroshi Nomura, Nagoya (JP)

(73) Assignee: Denso Corporation, Kariya (JP)

( * ) Notice: Subject to any disclaimer, the term of this patent is extended or adjusted under 35 U.S.C. 154(b) by 1 day.

(21) Appl. No.: 11/159,260

(22) Filed: Jun. 23, 2005

(65) Prior Publication Data
US 2006/0005627 A1 Jan. 12, 2006

(30) Foreign Application Priority Data
Jul. 6, 2004 (JP) .............................. 2004-199335

(51) Int. Cl.
*G01L 13/02* (2006.01)
(52) U.S. Cl. .......................................... 73/716; 73/736
(58) Field of Classification Search .................. 73/716, 73/736; 257/702
See application file for complete search history.

(56) References Cited

U.S. PATENT DOCUMENTS

| | | | |
|---|---|---|---|
| 5,112,142 A * | 5/1992 | Titcomb et al. | ............. 384/107 |
| 5,595,939 A * | 1/1997 | Otake et al. | .................. 438/51 |
| 5,747,694 A * | 5/1998 | Baba et al. | .................... 73/723 |
| 6,651,508 B1 | 11/2003 | Baba et al. | |

* cited by examiner

*Primary Examiner*—Jewel Thompson
*Assistant Examiner*—Andre Allen
(74) *Attorney, Agent, or Firm*—Posz Law Group, PLC

(57) ABSTRACT

A differential pressure detection type pressure sensor includes: a casing having a concavity; a pressure detection element disposed on a bottom of the concavity; a through hole; a first protection member in the concavity; and a second protection member in the through hole. The pressure detection element has one side facing the bottom of the concavity and the other side facing an opening of the concavity. The through hole includes one opening on the bottom of the concavity and the other opening on a part of the casing. The height of the first protection member facing the opening of the concavity and the height of the second protection member in the other opening of the through hole are on a same plane.

14 Claims, 2 Drawing Sheets

DIFFERENTIAL PRESSURE DETECTION TYPE PRESSURE SENSOR AND METHOD FOR MANUFACTURING THE SAME

CROSS REFERENCE TO RELATED APPLICATION

This application is based on Japanese Patent Application No. 2004-199335 filed on Jul. 6, 2004, the disclosure of which is incorporated herein by reference.

FIELD OF THE INVENTION

The present invention relates to a differential pressure detection type pressure sensor and a method for manufacturing a differential pressure detection type pressure sensor.

BACKGROUND OF THE INVENTION

In general, a differential pressure detection type pressure detector has a construction as stated below. The detector is disclosed in, for example, Japanese Patent Application Publication No. 2002-221462.

The pressure detector in the prior art includes a case which has a recess being open on one face side thereof, and it accommodates a pressure detection element in the recess. The pressure detection element is so arranged that its one face side confronts the open side of the recess, while its other face side confronts the bottom of the recess.

Besides, a penetrating hole or the like is provided in the bottom face of the recess. Thus, a pressure is exerted on one face of the pressure detection element from the open side of the recess, while another pressure is also exerted on the other face of the pressure detection element from the bottom face side of the recess. Further, a pressure is detected on the basis of the differential pressure between the pressures which are applied on one face and the other face of the pressure detection element.

Here, the recess, and the penetrating hole or the like provided on the bottom face side of the recess are filled up with a protective member of gel or the like. Thus, the pressure receiving faces of the pressure detection element, namely, one face and the other face thereof are covered with and protected by the protective member. Incidentally, the pressures are exerted on the pressure detection element through the protective member.

Meanwhile, in engine controls, etc., there are a large number of systems which detect pressures for the controls. In this regard, the pressure detector of the pertinent type is employed for the pressure detection.

Concretely, the pressure detector can be applied as one which is mounted on an EGR pipe being a member to-be-measured in the EGR system of the Diesel engine of an automobile vehicle, and which detects a differential pressure before and behind an orifice provided in the EGR pipe. Also, the pressure detector can be applied as one which is mounted on the exhaust pipe of the engine in order to detect the pressure loss of a DPF (Diesel particulate filter) disposed in the exhaust pipe, and which detects the differential pressure of the exhaust pipe before and behind the DPF.

In this manner, in an environment where the pressure detector is employed, a pressure medium to-be-measured contains, for example, a corrosive liquid, so that the pressure receiving faces of the pressure detection element need to be protected from the pressure medium. In the prior art, therefore, the pressure receiving faces of the pressure detection element is covered with and protected by the protective member as stated above.

Besides, in such an application as the engine control, the pressure detection element performs the pressure detection while undergoing the vibrations of the engine, etc. Especially in the application to the engine of the vehicle, the pressure detection element undergoes also the vibrations of the vehicle.

Here, in the case where the pressure receiving faces of the pressure detection element are covered with the protective member of gel or the like, stresses ascribable to the weight of the protective member itself act on the pressure receiving faces of the pressure detection element when the vibration is exerted on the pressure detector. Consequently, ripple noise ascribable to the vibration develops to be superposed on the output of the pressure detector.

Especially in a differential pressure detection type pressure detector which detects the differential pressure between the pressures of two pressure media, a pressure detection element has its one face and other face protected by locating protective members thereon, so that ripple noises ascribable to the protective members of both the faces are added up.

Concretely, the directions of the vibration are identical on one face and other face of the pressure detection element. Therefore, when the stress ascribable to the vibration has acted in the direction of pushing one face of the pressure detection element, the stress on the other face of the pressure detection element acts in the direction of pulling this other face.

Since the stresses act on the pressure receiving faces of the pressure detection element in this manner, the differential pressure detection type detector has involved the problem that the vibrational noise further increases to incur a large error, and that the pressure detector delivers the output of the error which is ascribable to the vibration differing from the acting pressures.

Here, it is also considered that, for the purpose of reducing the vibrational noises, the output of the pressure detector is filtered by a low-pass filter which removes output components at and below the vibrational frequencies of the noises. The filtering, however, gives rise to the demerit that pressure signal components above a filter frequency cannot be derived.

SUMMARY OF THE INVENTION

In view of the above-described problem, it is an object of the present invention to provide a differential pressure detection type pressure sensor having high detection accuracy. It is another object of the present invention to provide a method for manufacturing a differential pressure detection type pressure sensor having high detection accuracy.

A differential pressure detection type pressure sensor includes: a casing having a concavity disposed on one side of the casing; a pressure detection element disposed on a bottom of the concavity of the casing; a through hole disposed in the casing; and first and second protection members. The pressure detection element has two sides, one of which faces the bottom of the concavity, and the other one of which faces an opening of the concavity. The pressure detection element is capable of detecting pressure on the basis of differential pressure between a pressure applied to the bottom of the concavity and another pressure applied to the opening of the concavity. The through hole includes two openings, one of which is disposed on the bottom of the concavity so that the one side of the pressure detection element connects the through hole, and the other one of which is disposed on a part of the casing, the part being disposed on the one side of the casing and separated from the concavity. The through hole further includes a bent portion disposed in the middle of the through hole. The first protection member is disposed in the concavity for covering the other side of the pressure detection element facing the opening of the concavity. The second protection member is disposed in the through hole for filling in the through hole from the one opening to the other opening. The first protection member has a height of a surface facing the opening of the concavity. The second protection member has a height of a surface in the other opening of the through hole. The height of the first protection member and the height of the second protection member are disposed on a same plane.

In the above sensor, the pressure applied to the surface of the first protection member facing the opening of the concavity transmits the one side of the pressure detection element through the first protection member. The pressure applied to the surface of the second protection member facing the other opening of the through hole transmits the other side of the pressure detection element through the second protection member. When a ripple vibration is applied to the sensor, the stress caused by the weight of the protection member in proportion to the acceleration of the vibration is applied to the pressure detection element. Further, in general, the stress applied to the element is in proportion to the thickness of the protection member. Therefore, the stress by the vibration to affect the one side of the element is determined nby the thickness of the first protection member between the one side of the pressure detection element and the surface of the first protection member.

Here, the stress applied to the other side of the pressure detection element is cancelled at the bent portion of the through hole. Specifically, the stress in the second protection member from the other side of the pressure detection element to the surface in the other opening of the through hole is cancelled so that the stress becomes substantially zero. This is because the direction of the vibration in the second protection member from the other side of the pressure detection element to the bent portion is opposite to the direction of the vibration in the second protection member from the surface in the other opening of the through hole to the bent portion. Therefore, the directions of the stresses are also opposite, so that the stresses are cancelled. Thus, the stress applied to the other side of the element is determined by the thickness of the second protection member between the height of the one side of the pressure detection element and the surface of the second protection member. Further, the direction of the stress at the thickness of the second protection member is the same as the direction of the stress applied to the one side of the pressure detection element.

In the above sensor, since the height of the first protection member and the height of the second protection member are disposed on a same plane, the thickness of the first protection member is almost the same as the thickness of the second protection member. The stress applied to the element is in proportion to thickness of the protection member. Therefore, the stress applied to the one side of the element is almost equal to the stress applied to the other side of the element. Thus, the stresses caused by the vibration and applied to the one side and the other side of the pressure detection element are cancelled. Thus, the detection error caused by the vibration is reduced so that the detection accuracy of the sensor is improved.

Preferably, the first protection member has a thickness between the other side of the pressure detection element and the surface of the first protection member facing the opening of the concavity. The second protection member has a thickness between a height of the other side of the pressure detection element and the surface of the second protection member in the other opening of the through hole. The thickness of the first protection member is equal to the thickness of the second protection member.

Further, a method for manufacturing a differential pressure detection type pressure sensor described above includes the steps of: mounting the pressure detection element on the bottom of the concavity; and inserting the first and the second protection members into the concavity and the through hole under vacuum.

The method provides to insert the protection member into the through hole and the concavity effectively, although the through hole and the concavity have complicated structure. Thus, the pressure sensor having high detection accuracy is manufactured appropriately.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS (First Embodiment)

Figure 1:
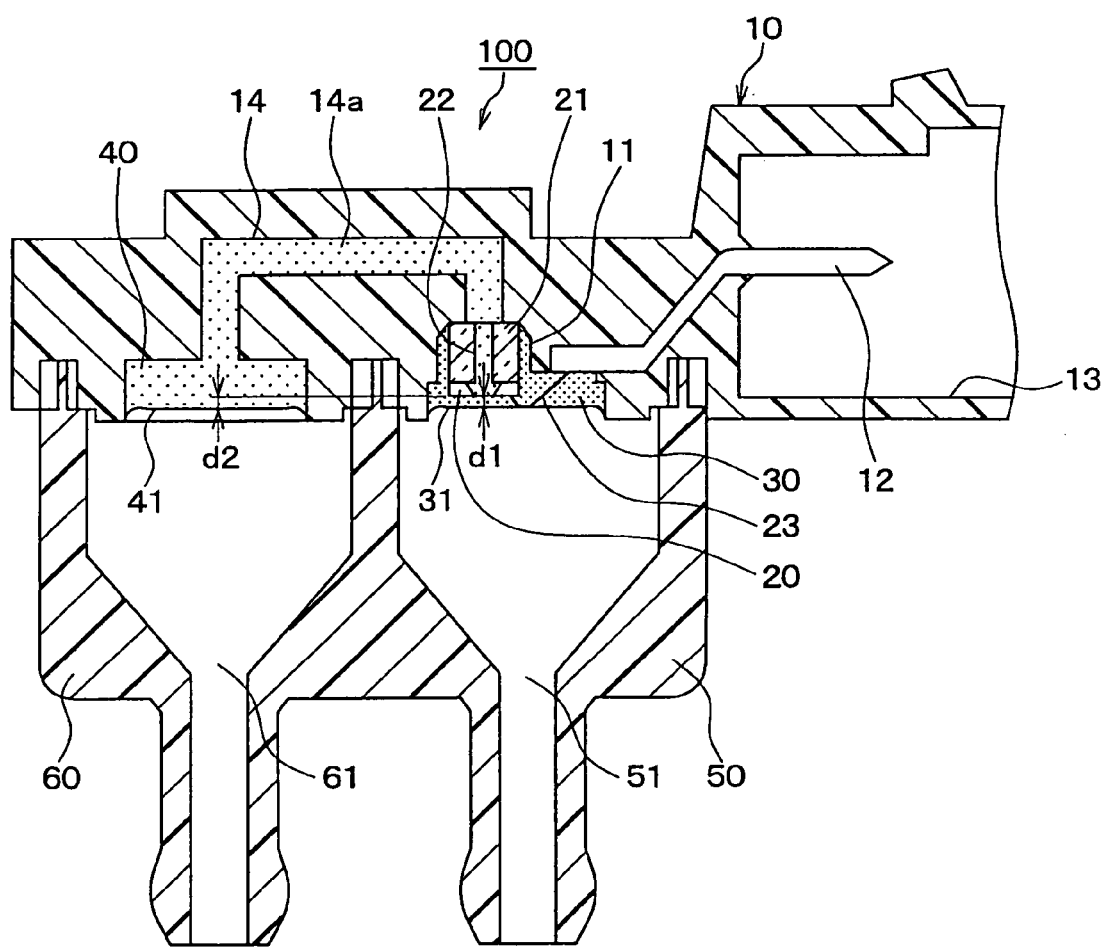
FIG. 1 is a cross sectional view showing a differential pressure detection type pressure detector according to a first embodiment of the present invention.

FIG. 1 is a view showing the schematic sectional construction of a pressure detector 100 of differential pressure detection type according to a first embodiment of the present invention.

Although not restricted in use, the pressure detector 100 is applicable as, for example, the above-mentioned pressure detector which detects the differential pressure before and behind the orifice provided in the EGR pipe of a diesel engine of an automobile vehicle, or which detects the differential pressure of the exhaust pipe before and behind a DPF disposed in this exhaust pipe of the engine. It is also applicable as a pressure detector which detects a pressure to-be-detected on the basis of the differential pressure between the pressure to-be-detected and the atmospheric pressure.

Broadly, the pressure detector 100 is constructed including a case 10, a pressure detection element 20 which is disposed in the case 10, a first protective member 30 which covers one face of the pressure detection element 20, a second protective member 40 which covers the other face of the pressure detection element 20, a first pressure introduction member 50 which introduces a pressure onto one face side of the pressure detection element 20, and a second pressure introduction member 60 which introduces a pressure onto the other face side of the pressure detection element 20.

The case 10 is fabricated by molding, for example, a resin material such as PBT (polybutylene terephthalate) or PPS (polyphenylene sulfide). One face of the case 10 (lower face in FIG. 1) is formed with an open recess 11 for mounting the pressure detection element 20 therein.

Each terminal 12 being a conductor member is unitarily provided in the case 10 by insertion molding. The terminal 12 is made of a conductive material, for example, copper, and part of this terminal 12 is arranged in a state where it is exposed at the bottom face of the recess 11.

Here, the exposed part of the terminal 12 is constructed so as to function as a bonding pad, by subjecting it to, for example, gold plating.

Besides, that end part of the terminal 12 which is remote from the bonding pad protrudes into the opening 13 of the case 10. The protrusive part of the terminal 12 is constructed as a connector which is connectable to an external equipment (such as external wiring member) not shown.

The pressure detection element 20 mounted in the recess 11 of the case 10 is an element for pressure detection, in which a front face (lower face in FIG. 1) is "one face" termed in the invention, while a rear face (upper face in FIG. 1) is the "other face" termed in the invention, and which detects a pressure on the basis of the differential pressure between pressures acting on both the front and rear faces. Concretely, the element 20 detects the pressure and generates an electric signal at a level corresponding to the detection value of the pressure.

Here, although not especially restricted, the pressure detection element 20 has, for example, a well-known construction which is made of a semiconductor substrate and which utilizes a piezo resistance effect. Concretely, the element 20 includes a diaphragm which is deformed by receiving the pressures on the front and rear faces thereof, and diffused resistors.

In the illustrated example, the pressure detection element 20 is in such a shape that, as shown in FIG. 1, part of the rear face side thereof is removed, the diaphragm being formed in correspondence with the removal part. Besides, the pressure detection element 20 is joined to and held by a glass pedestal 21 on its rear face side.

Further, the pressure detection element 20 is bonded to the bottom face of the recess 11 of the case 10 through the glass pedestal 21 by an adhesive, such as silicone rubber, not shown, thereby to be accommodated and fixed in the case 10. Here, the glass pedestal 21 is formed with a slot 22 which communicates with a penetrating hole 14 to be stated later.

In this way, the pressure detection element 20 is accommodated in the recess 11 with its front face side confronting the opening side of the recess 11, and with its rear face side confronting the bottom of the recess 11.

Besides, the input/output terminals (not shown) of the pressure detection element 20 are electrically connected to the bonding pads of the terminals 12 through bonding wire pieces 23 of gold, aluminum or the like. Thus, the pressure detection element 20 is electrically connected with the terminals 12 being the conductor members in the state where it is mounted in the recess 11 of the case 10.

Besides, as shown in FIG. 1, the case 10 is provided with the penetrating hole 14. The penetrating hole 14 is such that one end side thereof is open to the rear face side of the pressure detection element 20 through the bottom face of the recess 11, that the intermediate part thereof is folded back, and that the other end side thereof is open to a position separate from the recess 11 in one face of the case 10.

In this embodiment, the penetrating hole 14 has its middle portion bent in the shape of letter U with both its end openings confronting one face side of the case 10. Therefore, a part extending in parallel with one face of the case 10 exists in the bent portion 14a.

Further, the recess 11 is filled up with the first protective member 30 which covers the front face of the pressure detection element 20. On the other hand, the penetrating hole 14 is filled up with the second protective member 40 which extends from the rear face side of the pressure detection element 20 to the opening of the penetrating hole 14 on the other side thereof.

Incidentally, the second protective member 40 is packed into the slot 22 of the glass pedestal 21 communicating with the penetrating hole 14, thereby to cover and protect the rear face of the pressure detection element 20.

Besides, as shown in FIG. 1, the front face 31 of the first protective member 30 confronting the opening of the recess 11 is flush with the front face 41 of the second protective member 40 confronting the opening of the penetrating hole 14 on the other end side thereof. Incidentally, "being flush" termed here signifies that the faces 31 and 41 may be at the same height within the allowable ranges of manufactural errors and dimensional errors.

Further, the first protective member 30 is packed into the recess 11, thereby to cover the pressure detection element 20 and to bury and seal the bonding wire pieces 23 and also the interfaces between the terminals 12 and the case 10.

As the first and second protective members 30, 40, it is possible to adopt ones made of a material which has an appropriate modulus of elasticity not exerting excessive stresses on the portions to-be-sealed, and which has resistances to chemicals.

Although no restriction is intended, a gel material such as fluoric gel or fluorosilicone gel, or a rubber material of fluorine type, for example, can be adopted for the protective members 30, 40.

The pressure detection element 20, the terminals 12, the bonding wire pieces 23, the connection parts between the pressure detection element 20 and the bonding wire pieces 23, and the connection parts between the terminals 12 and the bonding wire pieces 23 are covered with the protective members 30, 40, thereby to be protected from the chemicals, to ensure electrical insulation and to be prevented from corroding.

Besides, the first pressure introduction member 50 for introducing the pressure onto the front face side of the pressure detection element 20, and the second pressure introduction member 60 for introducing the pressure onto the rear face side of the pressure detection element 20 are attached on one face side of the case 10 by a bonding material or the like, not shown.

Here, both the pressure introduction members 50, 60 are molded and united using a resin material, for example, PBT or PPS. The pressure introduction members 50, 60 have the first and the second pressure introduction ports 51, 61, respectively.

Further, the first and the second pressure introduction ports 51, 61 being the internal spaces of the respective pressure introduction members 50, 60 are partitioned from each other, and the different pressures are introduced from the respective pressure introduction ports 51, 61. Of course, the pressure introduction members 50, 60 may well be separate members which are not unitary.

In the case, for example, where the pressure detector 100 is applied for detecting the differential pressure of the exhaust pipe before and behind the DPF disposed in the exhaust pipe of the diesel engine of the automobile, it is possible to introduce the upstream side pressure of the DPF in the exhaust pipe from the first pressure introduction port 51, and the downstream side pressure of the DPF in the exhaust pipe from the second pressure introduction port 61.

Within the case 10, the upstream side pressure exerted on the front face 31 of the first protective member 30 confronting the opening of the recess 11 is exerted on the front face of the pressure detection element 20 through the first protective member 30, while the downstream side pressure exerted on the front face 41 of the second protective member 40 confronting the opening of the penetrating hole 14 on the other end side thereof is exerted on the rear face of the pressure detection element 20 through the second protective member 40.

Besides, in the pressure detection element 20, the respective pressures are received by the front and rear faces, and the pressure detection is performed on the basis of the differential pressure between the pressures of both the faces.

Next, a method of manufacturing such a pressure detector 100 will be described. A pressure detection element 20 which is united with the glass pedestal 21 is bonded and fixed in the recess 11 of the case 10 by an adhesive. Thereafter, the pressure detection element 20 and terminals 12 as terminal pins are subjected to wire bonding, thereby to be connected by bonding wire pieces 23.

After the pressure detection element 20 has been disposed in the recess 11 of the case 10 in this way, first and second protective members 30 and 40 are respectively inserted into the recess 11 and penetrating hole 14 of the case 10 in a vacuum atmosphere.

Concretely, the case 10 in which the pressure detection element 20 has been disposed as stated above is put in a vacuum chamber, the internal pressure of which is lowered to establish the vacuum atmosphere. Thereafter, the first and second protective members 30 and 40 are respectively injected in the established atmosphere by employing dispensers or the likes. Subsequently, the first and second protective members 30 and 40 are respectively hardened. Then, the operations of filling with the first and second protective members 30 and 40 are respectively completed.

Thereafter, first and second pressure introduction members 50 and 60 which are united in this example are fixed by bonding or the like in such a manner that they are put on one face side of the case 10. Thus, the pressure detector 100 of this embodiment is finished up.

Meanwhile, according to this embodiment, the pressure detector 100 having the following features is provided:

The pressure detector 100 includes the case 10 which has the recess 11 being open on one face side, and the pressure detection element 20 which is accommodated in the recess 11 with its front face (one face) side confronting the opening side of the recess 11 and with its rear face (other face) side confronting the bottom of the recess 11, and which detects a pressure on the basis of the differential pressure between pressures acting on its front face and rear face.

The case 10 is provided with the penetrating hole 14 one end side of which is open to the rear face side of the pressure detection element 20 through the bottom face of the recess 11, the intermediate part of which is folded back, and the other end side of which is open to the position of one face of the case 10 as is separate from the recess 11.

The recess 11 is filled up with the first protective member 30 which covers the front face of the pressure detection element 20, and the penetrating hole 14 is filled up with the second protective member 40 which extends from the rear face side of the pressure detection element 20 to the opening of the penetrating hole 14 on the other end side thereof.

The front face 31 of the first protective member 30 confronting the opening of the recess 11 is flush with the front face 41 of the second protective member 40 confronting the opening of the penetrating hole 14 on the other end side thereof.

The pressure detector 100 of this embodiment features these points.

According to this pressure detector, the pressure exerted on the front face 31 of the first protective member 30 confronting the opening of the recess 11 is exerted on the front face of the pressure detection element 20 through the first protective member 30, and the pressure exerted on the front face 41 of the second protective member 40 confronting the opening of the penetrating hole 14 on the other end side thereof is exerted on the rear face of the pressure detection element 20 through the second protective member 40.

Besides, in the pressure detection element 20, the pressure detection is performed on the basis of the differential pressure between the pressures acting on the front face and the rear face.

Here, in a case where a vibrational ripple has acted on the pressure detector, generally the weights of the protective members themselves are proportional to the acceleration of a vibration and are transmitted as stresses on the pressure detection element. Also in general, the magnitudes of the stresses (error components) acting on the pressure detection element are proportional to the thicknesses of the protective members.

In this embodiment, therefore, that one of the error components, namely, the stresses ascribable to the vibration which influences the front face (one face) side of the pressure detection element 20 is determined by the thickness d1 (refer to FIG. 1) of the first protective member 30 from the front face of the pressure detection element 20 to the front face 31 of the first protective member 30.

On the other hand, regarding the stress which acts on the rear face (other face) side of the pressure detection element 20, stress components are firstly cancelled by the bent portion 14a of the penetrating hole 14. That is, the stress components on that part of the second protective member 40 which extends from the rear face of the pressure detection element 20 to the position thereof remote from and flush with the rear face of the pressure detection element 20, through the bent portion 14a, are cancelled to become substantially zero.

The reason therefore is that the direction of the vibration of the part of the second protective member 40 extending from the rear face of the pressure detection element 20 to the bent portion 14a is reverse to the direction of the vibration of the part of the same 40 extending from the bent portion 14a to the position thereof remote from and flush with the rear face of the pressure detection element 20, so also the directions of the stress components become reverse to cancel these stress components.

Therefore, the stress on the rear face (other face) side of the pressure detection element 20 is determined by the thickness d2 (refer to FIG. 1) of that part of the second protective member 40 which extends from the position remote from and flush with the rear face of the pressure detection element 20, to the front face 41 of this second protective member 40.

That is, on the rear face side of the pressure detection element 20, the second protective member 40 exists from the rear face of the pressure detection element 20 to its front face 41, but the essential part of the second protective member 40 pertinent to the stress is only the part thereof having the thickness d2. Besides, at the part of the second protective member 40 having the thickness d2, the direction of the stress is the same as that of the stress acting on the front face (one face) side of the pressure detection element 20.

Further, in this embodiment, the front face 31 of the first protective member 30 and that 41 of the second protective member 40 are flush with each other. Therefore, the thickness d1 of the first protective member 30 and that d2 of the second protective member 40 become substantially the same though an error corresponding to the thickness of the pressure detection element 20 is involved.

Now that the magnitudes of the stresses acting on the pressure detection element are proportional to the thicknesses of the protective members, the magnitudes of the stress acting on the front face (one face) of the pressure detection element 20 and the stress acting on the rear face (other face) thereof become substantially equal, and the directions of the stresses are the same. Therefore, the stresses exerted on the pressure detection element 20 by the vibration are cancelled on the front face side and rear face side of this pressure detection element, and they result in substantially zero.

In this manner, according to this embodiment, it is permitted to realize the pressure detector in which the error components ascribable to the vibration are hardly influential, and which outputs substantially only the components of the pressures, and enhancement in the precision of the pressure detector can be achieved.

As thus far described, according to this embodiment, in the pressure detector 100 of differential detection type wherein both the front and rear pressure receiving faces of the pressure detection element 20 are respectively covered with the protective members 30 and 40, the occurrence of the vibrational ripple can be prevented to the utmost, and the output error ascribable to the vibration can be reduced.

Besides, according to this embodiment, in a method of manufacturing the pressure detector 100, it is possible to provide the method of manufacturing the pressure detector characterized in that, after the pressure detection element 20 has been disposed in the recess 11 of the case 10, the first and second protective members 30 and 40 are respectively injected into the recess 11 and penetrating hole 14 of the case 10 in the vacuum atmosphere.

According to the manufacturing method, the protective members 30 and 40 can be efficiently injected and packed into the recess 11 and the penetrating hole 14 in a complicated shape having a bent shape. That is, according to this manufacturing method, it is possible to provide the method of manufacturing the pressure detector 100 as can appropriately manufacture the pressure detector of this embodiment.

(Second Embodiment)

Figure 2:
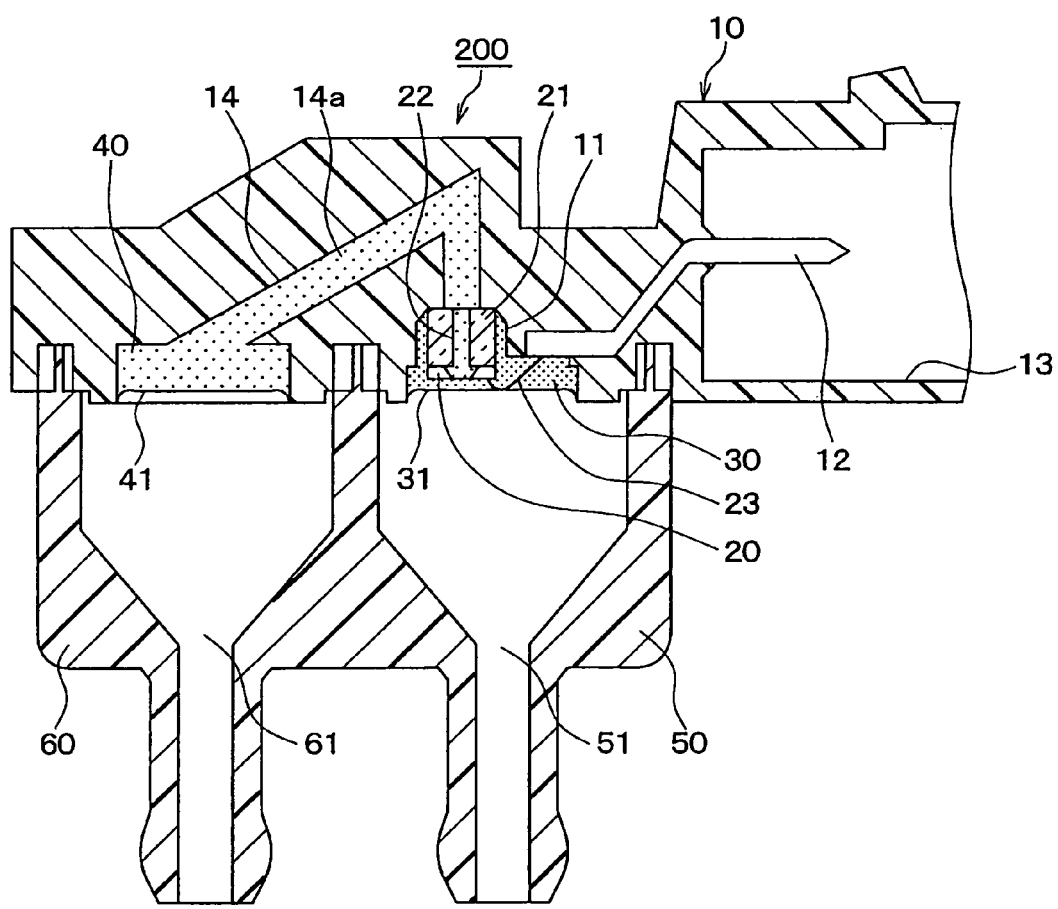
FIG. 2 is a cross sectional view showing a differential pressure detection type pressure detector according to a second embodiment of the present invention.

FIG. 2 is a view showing the schematic sectional construction of a pressure detector 200 of differential pressure detection type according to a second embodiment of the present invention. The point of difference of this embodiment from the foregoing embodiment will be chiefly described.

In the foregoing embodiment, as shown in FIG. 1, the penetrating hole 14 has its middle portion bent in the shape of letter U with both its end openings confronting one face side of the case 10.

In contrast, in the pressure detector 200 of this embodiment, as shown in FIG. 2, a penetrating hole 14 has its middle portion bent in the shape of letter V with both its end openings confronting one face side of a case 10.

According to the V-shaped penetrating hole, in a bent portion 14a, a part extending in parallel with one face of the case 10 as in the U-shaped penetrating hole is not existent. That is, in the case 10, the penetrating hole 14 and a recess 11 communicating therewith are in a hole shape which consists only of parts extending aslant one face of the case 10.

In this embodiment, therefore, it is possible to realize a case construction with which, after the case 10 has been molded, a mold is released more easily than with the case construction of the foregoing embodiment.

(Modifications)

By the way, in each of the pressure detectors of the above embodiments, the front face side of the pressure detection element 20 has been set as "one face" termed in the present invention, and the rear face side thereof as the "other face" termed in the invention. To the contrary, however, the rear face of the pressure detection element 20 may well be set as "one face", and the front face thereof as the "other face".

In this case, although a structure becomes somewhat complicated, the pressure detection element 20 united with the glass pedestal 21 may be mounted within the recess 11 in a shape in which it is turned upside down, in the pressure detector shown in, for example, FIG. 1. An electric connection method, and a fixation method for the pressure detection element 20 on that occasion can be realized by appropriate design alterations.

Besides, the pressure detection element 20 need not be the semiconductor type one, but it may well be a pressure detection element made of, for example, ceramics.

Essentially, the invention consists in a pressure detector wherein the pressure detection element 20 is arranged in the case 10 having the recess 11 open on one face side, characterized in that the case 10 is provided with the penetrating hole 14 of bent shape, and that the front face 31 of the first protective member 30 confronting the opening of the recess 11 is flush with the front face 41 of the second protective member 40 confronting the opening of the penetrating hole 14 on the end side thereof remote from the protective member 30. The other parts can be appropriately subjected to design alterations.

Such changes and modifications are to be understood as being within the scope of the present invention as defined by the appended claims.

What is claimed is:

1. A differential pressure detection type pressure sensor comprising:

a casing having a concavity disposed on one side of the casing;

a pressure detection element disposed on a bottom of the concavity of the casing;

a through hole disposed in the casing; and first and second protection members, wherein the pressure detection element has two sides, one of which faces the bottom of the concavity, and the other one of which faces an opening of the concavity, the pressure detection element is capable of detecting pressure on the basis of differential pressure between a pressure applied to the bottom of the concavity and another pressure applied to the opening of the concavity, the through hole includes two openings, one of which is disposed on the bottom of the concavity so that the one side of the pressure detection element connects the through hole, and the other one of which is disposed on a part of the casing, the part being disposed on the one side of the casing and separated from the concavity, the through hole further includes a bent portion disposed in the middle of the through hole, the first protection member is disposed in the concavity for covering the other side of the pressure detection element facing the opening of the concavity, the second protection member is disposed in the through hole for filling in the through hole from the one opening to the other opening, the first protection member has a height of a surface facing the opening of the concavity, the second protection member has a height of a surface in the other opening of the through hole, and the height of the first protection member and the height of the second protection member are disposed on a same plane.

2. The sensor according to claim 1, wherein the height of the first protection member is equal to the height of the second protection member.

3. The sensor according to claim 1, wherein the first and the second protection members are made of gel.

4. The sensor according to claim 1, wherein the first and the second protection members are made of resin.

5. The sensor according to claim 1, wherein the bent portion of the through hole has a reverse U-shape.

6. The sensor according to claim 1, wherein the bent portion of the through hole has a reverse V-shape.

7. The sensor according to claim 1, wherein the first protection member has a thickness between the other side of the pressure detection element and the surface of the first protection member facing the opening of the concavity, the second protection member has a thickness between a height of the other side of the pressure detection element and the surface of the second protection member in the other opening of the through hole, and the thickness of the first protection member is equal to the thickness of the second protection member.

8. A method for manufacturing a differential pressure detection type pressure sensor according to claim 1, the method comprising the steps of:

mounting the pressure detection element on the bottom of the concavity; and inserting the first and the second protection members into the concavity and the through hole under vacuum.

9. The sensor according to claim 8, wherein the height of the first protection member is equal to the height of the second protection member.

10. The sensor according to claim 8, wherein the first and the second protection members are made of gel.

11. The sensor according to claim 8, wherein the first and the second protection members are made of resin.

12. The sensor according to claim 8, wherein the bent portion of the through hole has a reverse U-shape.

13. The sensor according to claim 8, wherein the bent portion of the through hole has a reverse V-shape.

14. The sensor according to claim 8, wherein the first protection member has a thickness between the other side of the pressure detection element and the surface of the first protection member facing the opening of the concavity, the second protection member has a thickness between a height of the other side of the pressure detection element and the surface of the second protection member in the other opening of the through hole, and the thickness of the first protection member is equal to the thickness of the second protection member.

* * * * *